(12) United States Patent
Lee et al.

(10) Patent No.: US 11,065,935 B2
(45) Date of Patent: Jul. 20, 2021

(54) THERMAL MANAGEMENT SYSTEM FOR ELECTRIC VEHICLE

(71) Applicants: Hyundai Motor Company, Seoul (KR); Kia Motors Corporation, Seoul (KR)

(72) Inventors: Sang Shin Lee, Gyeonggi-do (KR); Man Ju Oh, Gyeonggi-do (KR); So La Chung, Seoul (KR); Jae Woong Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 338 days.

(21) Appl. No.: 16/379,340

(22) Filed: Apr. 9, 2019

(65) Prior Publication Data
US 2020/0180395 A1  Jun. 11, 2020

(30) Foreign Application Priority Data
Dec. 11, 2018 (KR) .................. 10-2018-0158959

(51) Int. Cl.
*B60H 1/00* (2006.01)
*B60H 1/22* (2006.01)
*B60H 1/24* (2006.01)
*B60H 1/32* (2006.01)

(52) U.S. Cl.
CPC ..... *B60H 1/00642* (2013.01); *B60H 1/00007* (2013.01); *B60H 1/00278* (2013.01); *B60H 1/00392* (2013.01); *B60H 1/00485* (2013.01); *B60H 1/2218* (2013.01);
(Continued)

(58) Field of Classification Search
CPC ............ B60H 1/00642; B60H 1/00007; B60H 1/00278; B60H 1/00392; B60H 1/00485; B60H 1/2218; B60H 1/2225; B60H 1/24; B60H 1/323; B60H 2001/2253
See application file for complete search history.

(56) References Cited

U.S. PATENT DOCUMENTS 6,192,698 B1 * 2/2001 Kakehashi ......... B60H 1/00064
165/203
9,797,656 B2 * 10/2017 Matsumoto ......... F28D 1/05308
(Continued)

FOREIGN PATENT DOCUMENTS

KR         101436960 B1    9/2014

*Primary Examiner* — Jon T. Schermerhorn, Jr.
(74) *Attorney, Agent, or Firm* — Mintz Levin Cohn Ferris Glovsky and Popeo, P.C.; Peter F. Corless

(57) ABSTRACT

An electric vehicle thermal management system is provided. The system includes an inside AC unit having an air inlet unit and an air outlet unit and a cooling core embedded therein. A heating core is disposed between the air outlet unit of the inside AC unit and the cooling core and a control door is disposed inside the inside AC unit to adjust air supply to the heating core. A first flow path circulates to pass through the heating core and includes an electric heater. A branch flow path is branched from downstream point of the heating core of the first flow path and passing through a high voltage battery heat exchange unit. A control valve is disposed in a branch point between the first flow path and the branch flow path and a second flow path circulates between a compressor and a condenser and the cooling core.

16 Claims, 9 Drawing Sheets

(52) U.S. Cl.
CPC ............ B60H 1/2225 (2013.01); B60H 1/24 (2013.01); B60H 1/323 (2013.01); B60H 2001/2253 (2013.01)

(56) References Cited

U.S. PATENT DOCUMENTS

| | | | |
|---|---|---|---|
| 2014/0298837 A1* | 10/2014 | Tanda | B60H 1/00921 62/150 |
| 2015/0053376 A1* | 2/2015 | Matsumoto | B60H 1/00328 165/144 |
| 2016/0152110 A1* | 6/2016 | Kim | B60H 1/00057 165/203 |
| 2017/0349026 A1* | 12/2017 | Kim | B60H 1/00671 |
| 2018/0001732 A1* | 1/2018 | Shin | B60H 1/00842 |

\* cited by examiner

THERMAL MANAGEMENT SYSTEM FOR ELECTRIC VEHICLE

CROSS REFERENCE TO RELATED APPLICATION

The present application claims priority to Korean Patent Application No. 10-2018-0158959, Dec. 11, 2018 the entire contents of which is incorporated herein for all purposes by this reference.

BACKGROUND

1. Technical Field

The present disclosure relates to a thermal management system for an electric vehicle, and more particularly, to a thermal management system that increases or decreases a temperature of the interior of a vehicle or a high voltage battery within the electric vehicle.

2. Description of the Related Art

Traditionally, a vehicle has operated by obtaining driving energy from the combustion of a fossil fuel. However, unlike the existing vehicle, an electric vehicle operates by obtaining driving energy through electric energy from a battery module rather than the fossil fuel. The battery module includes a plurality of battery cells connected in series. To effectively charge and discharge the battery module, the battery module must maintains a proper temperature. Accordingly, the electric vehicle includes a thermal management system for the electric vehicle that checks the battery module in real time based on an outdoor environment, a driving state of a vehicle, etc. to thus decrease or increase a temperature of the battery module.

Meanwhile, in an electric vehicle thermal management field of the related art, to adjust a temperature of a high voltage battery and an indoor temperature of the vehicle, the high voltage battery and the indoor temperature of the vehicle were operated through separate thermal management systems. To provide such a separate thermal management system, a substantial number of parts are required and a large space is occupied within the vehicle. Accordingly, an integrated thermal management system capable of adjusting the temperature of the high voltage battery and the indoor temperature of the vehicle is required.

The contents described as the related art have been provided merely to assist in understanding the background of the present disclosure and should not be considered as corresponding to the related art known to those having ordinary skill in the art.

SUMMARY

An object of the present disclosure is to provide a thermal management system for an electric vehicle that increases or decreases a temperature of the interior of a vehicle or a high voltage battery within the electric vehicle.

According to an exemplary embodiment of the present disclosure, a thermal management system for an electric vehicle may include an inside air conditioning (AC) unit having an air inlet unit and an air outlet unit; a cooling core embedded within the inside air conditioning unit; a heating core disposed between the air outlet unit of the inside air conditioning unit and the cooling core; a control door disposed inside the inside air conditioning unit and configured to adjust air supply to the heating core; a first flow path through which a first refrigerant flows, circulating to pass through the heating core, and including an electric heater; a branch flow path branched from a downstream point of the heating core of the first flow path and passing through a high voltage battery heat exchange unit; a control valve disposed in a branch point between the first flow path and the branch flow path; and a second flow path through which a second refrigerant flows and circulating between a compressor and a condenser and the cooling core.

Further, inside air or outdoor air may be introduced into the air inlet unit of the inside air conditioning unit, and the air outlet unit may be connected to an indoor space of the vehicle. The control door may be disposed between the cooling core and the heating core to control whether air flowing through the cooling core flows into the heating core. The branch flow path may be branched at a downstream point of the heating core of the first flow path, pass through the high voltage battery heat exchange unit, and join again at an upstream point of the electric heater of the first flow path. The control valve may adjust a supply of the first refrigerant to the branch flow path.

Additionally, a flow space may be formed on a side of the heating core inside the inside air conditioning unit, and air may flow through the cooling core based on the operation of the control door, and then flow into the air outlet unit through the flow space or pass through the cooling core and then flow into the air outlet unit through the heating core. The thermal management system for the electric vehicle may further include a controller configured to operate the compressor, the electric heater, the control door and the control valve to adjust a temperature of an interior of the vehicle or a high voltage battery.

In a first mode for increasing the indoor temperature of the vehicle or the temperature of the high voltage battery, the controller may be configured to operate the electric heater, adjust the control valve to allow the first refrigerant to flow through the branch flow path, and adjust the control door to allow air to flow through the heating core. In a second mode for increasing the indoor temperature of the vehicle and cooling the high voltage battery, the controller may be configured to adjust the control valve to allow the first refrigerant to flow through the branch flow path, and adjust the control door to allow air to flow through the heating core.

In a third mode for cooling the interior of the vehicle and increasing the temperature of the high voltage battery, the controller may be configured to operate the compressor and the electric heater, adjust the control valve to allow the first refrigerant to flow through the first flow path and the branch flow path at the branch point, and adjust the control door to allow air to flow through the flow space. In a fourth mode for cooling the interior of the vehicle and the high voltage battery and dehumidifying outside air or inside air of the vehicle, the controller may be configured to operate the compressor, adjust the control valve to allow the first refrigerant to flow through the first flow path and the branch flow path at the branch point, and adjust the control door to allow air to flow through the electric heater.

In a fifth mode for maintaining the temperature of the high voltage battery and increasing the indoor temperature of the vehicle, the controller may be configured to operate the electric heater, adjust the control valve to allow the first refrigerant to flow through the first flow path, and adjust the control door to allow air to flow through the heating core. In a sixth mode for maintaining the indoor temperature of the vehicle and increasing the temperature of the high voltage battery, the controller may be configured to operate the electric heater, and adjust the control valve to allow the first refrigerant to flow through the branch flow path at the branch point. In a seventh mode for maintaining the temperature of the high voltage battery and cooling the interior of the vehicle, the controller may be configured to operate the compressor to control air to flow through the flow space.

Further, an outlet for discharging air to an outside of the vehicle may be formed in the air outlet unit of the inside air conditioning unit and an opening and closing door that adjusts the opening and closing of the outlet may be provided. In an eighth mode for maintaining the indoor temperature of the vehicle and cooling the high voltage battery, the controller may be configured to operate the compressor, adjust the control valve to allow the first refrigerant to flow through the branch flow path, adjust the control door to allow air to flow through the heating core, and adjust the outlet to allow the air to be discharged to the outside of the vehicle.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
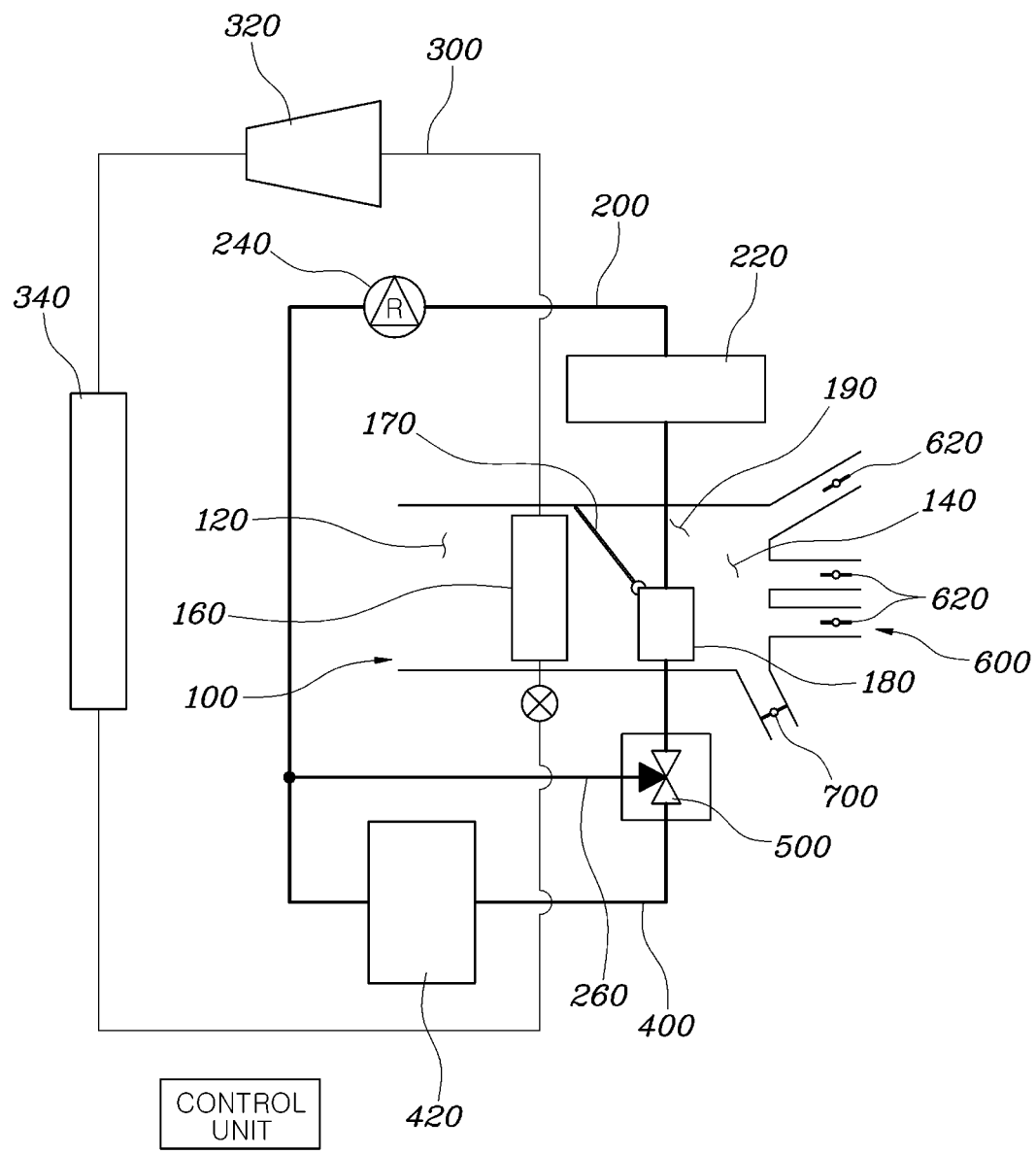
FIG. 1 is a diagram illustrating a thermal management system for an electric vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Figure 2:
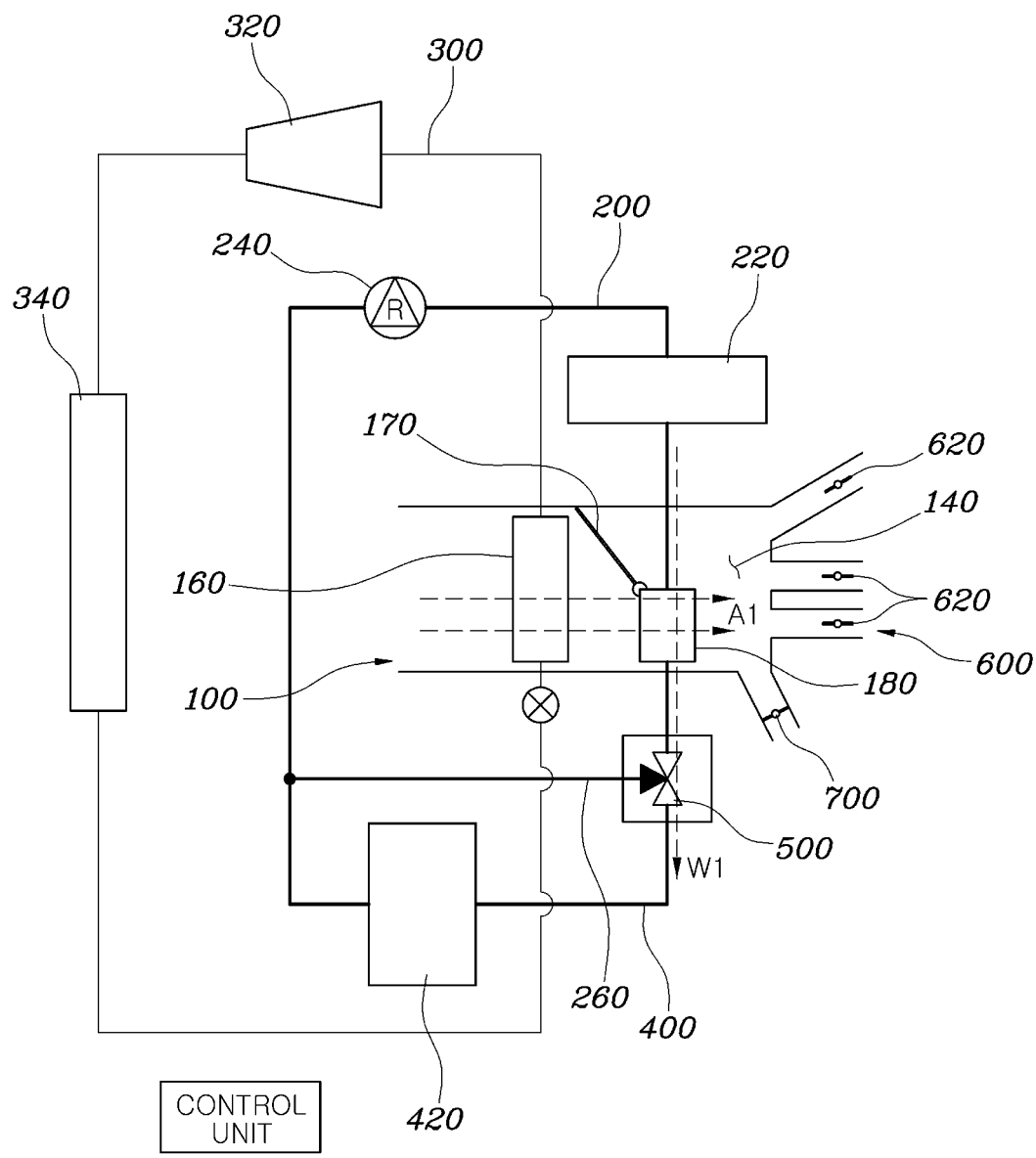
FIG. 2 is a diagram illustrating a first mode of a thermal management system for an electric vehicle according to an exemplary embodiment of the present disclosure.
Figure 3:
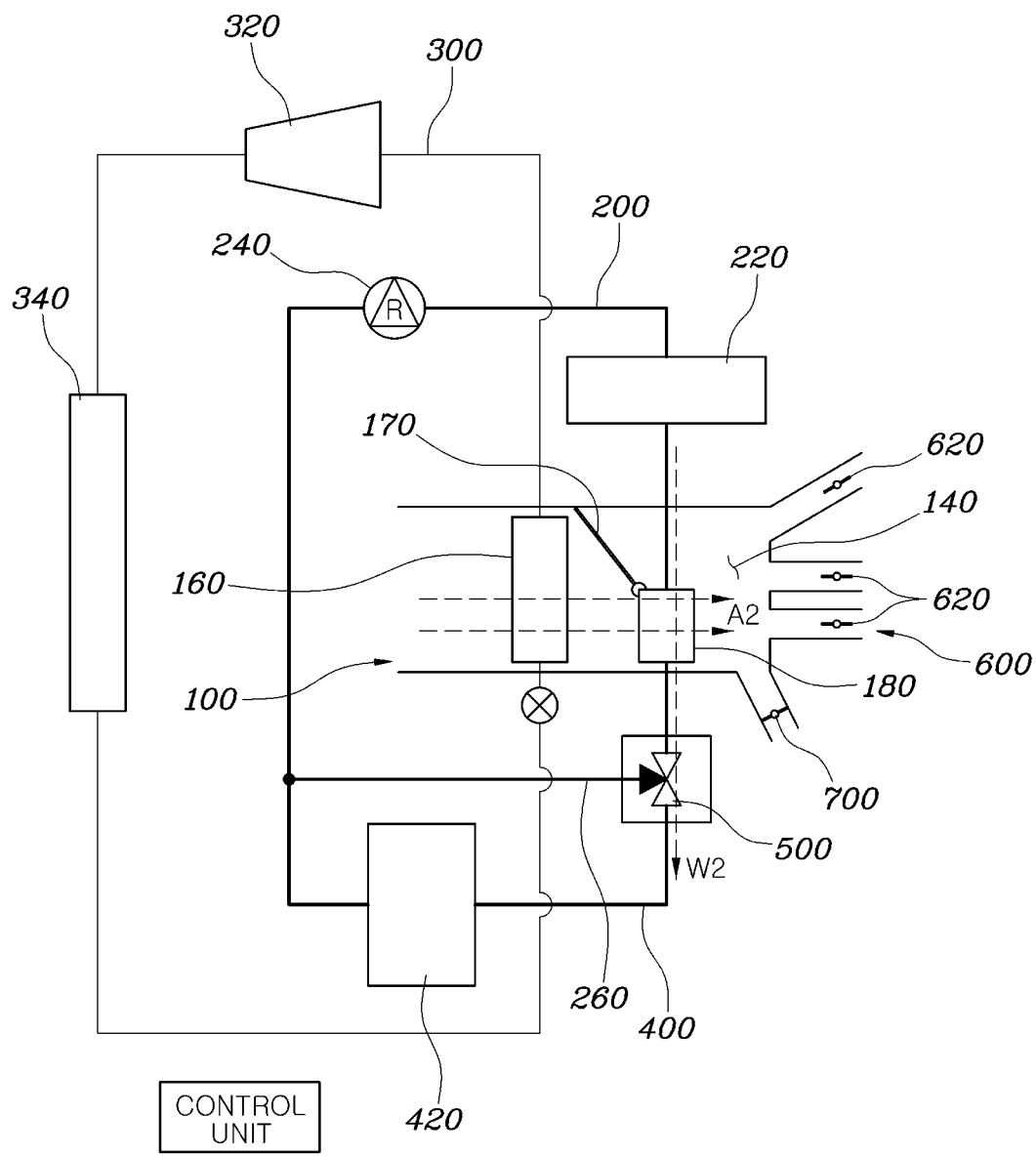
FIG. 3 is a diagram illustrating a second mode of a thermal management system for an electric vehicle according to another exemplary embodiment of the present disclosure.
Figure 4:
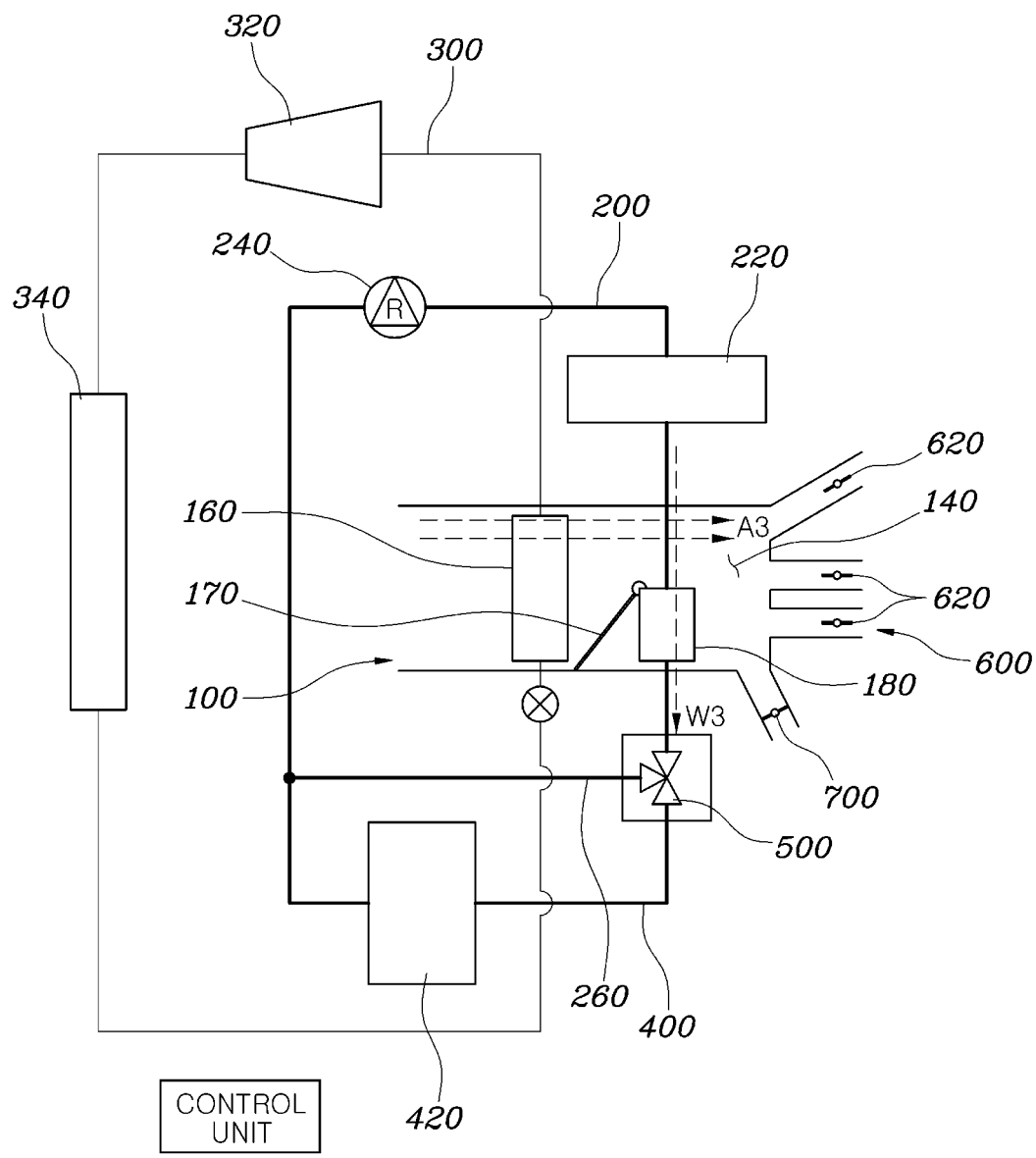
FIG. 4 is a diagram illustrating a third mode of a thermal management system for an electric vehicle according to another exemplary embodiment of the present disclosure.
Figure 5:
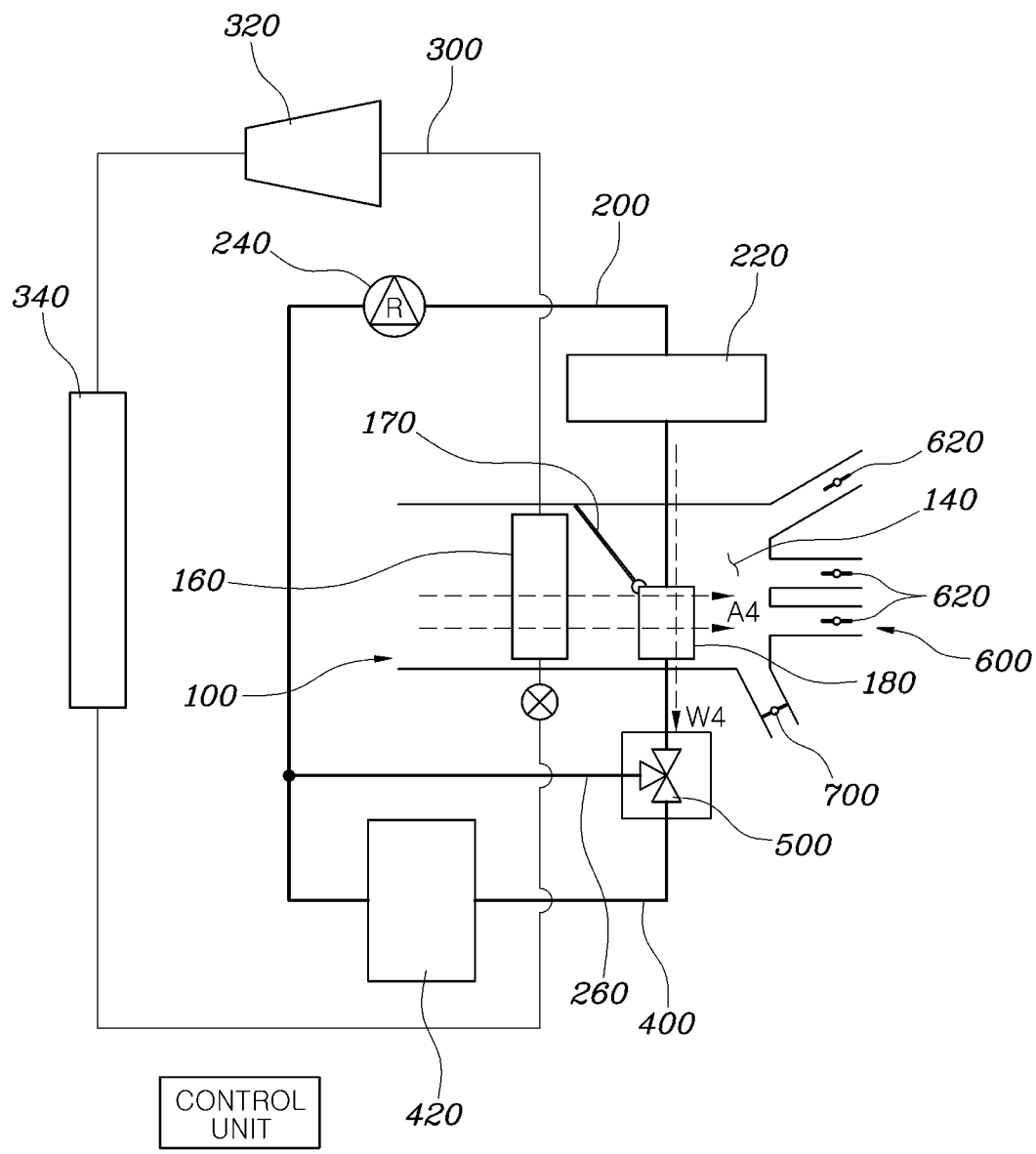
FIG. 5 is a diagram illustrating a fourth mode of a thermal management system for an electric vehicle according to another exemplary embodiment of the present disclosure.
Figure 6:
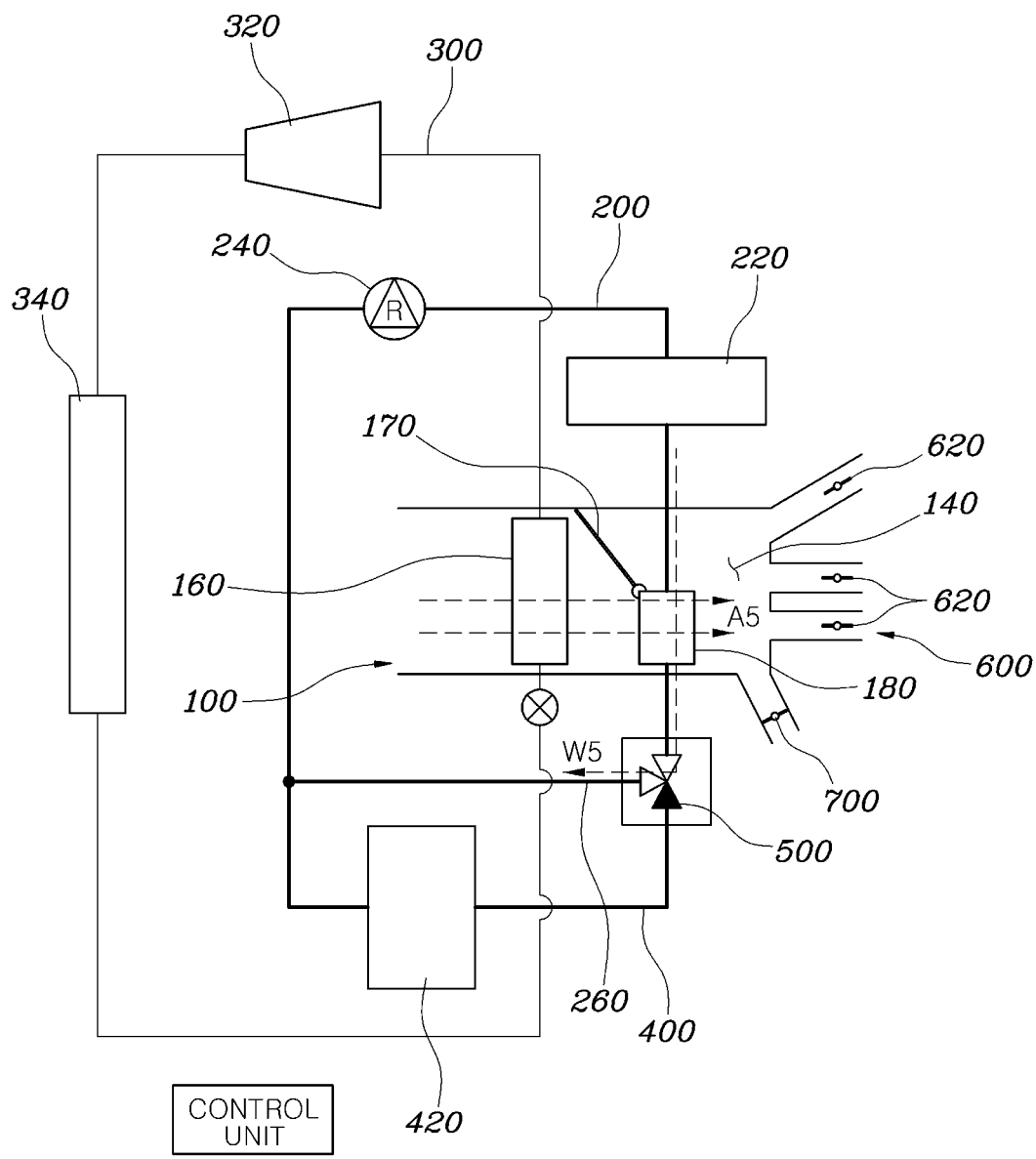
FIG. 6 is a diagram illustrating a fifth mode of a thermal management system for an electric vehicle according to another exemplary embodiment of the present disclosure.
Figure 7:
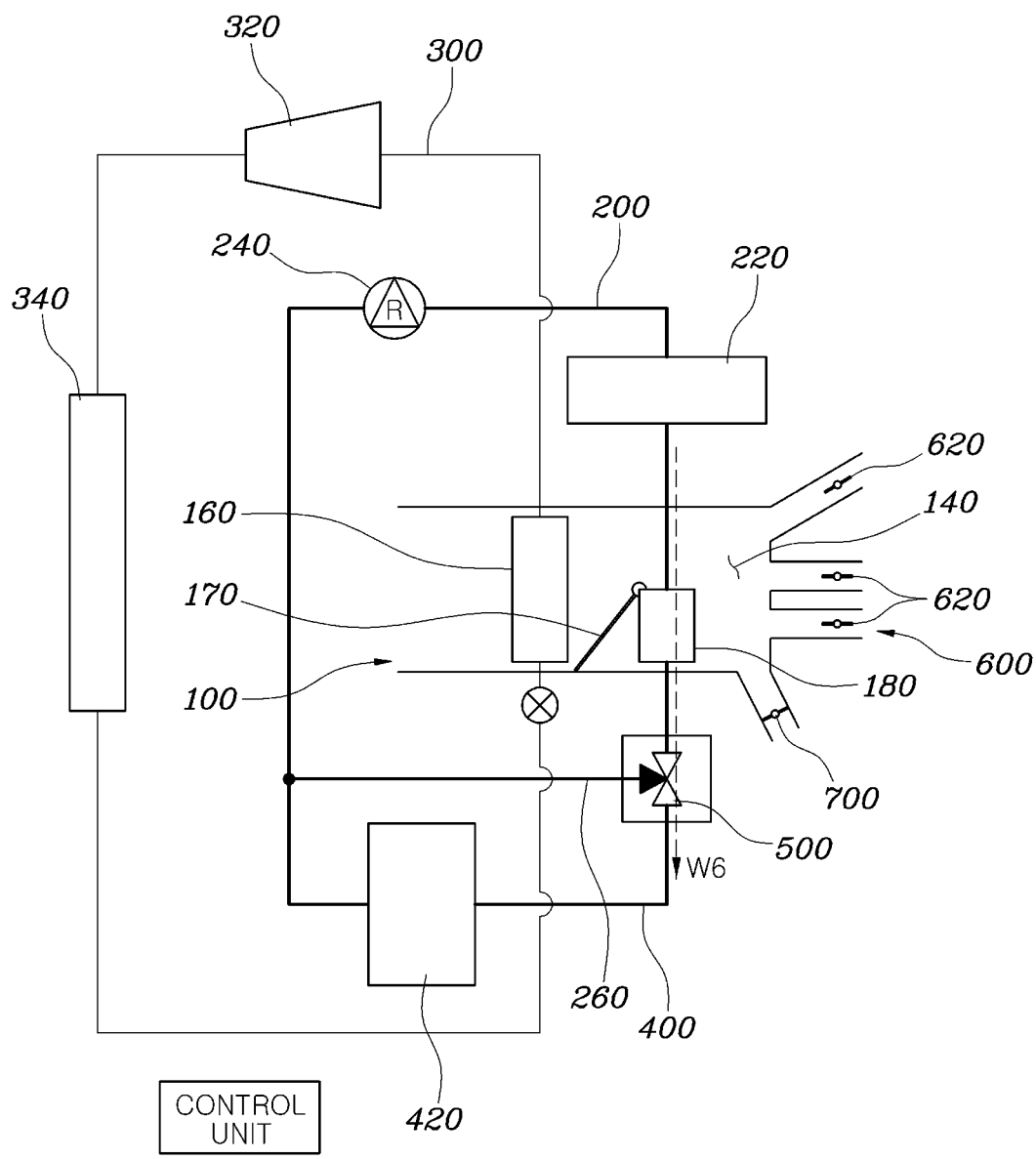
FIG. 7 is a diagram illustrating a sixth mode of a thermal management system for an electric vehicle according to another exemplary embodiment of the present disclosure.
Figure 8:
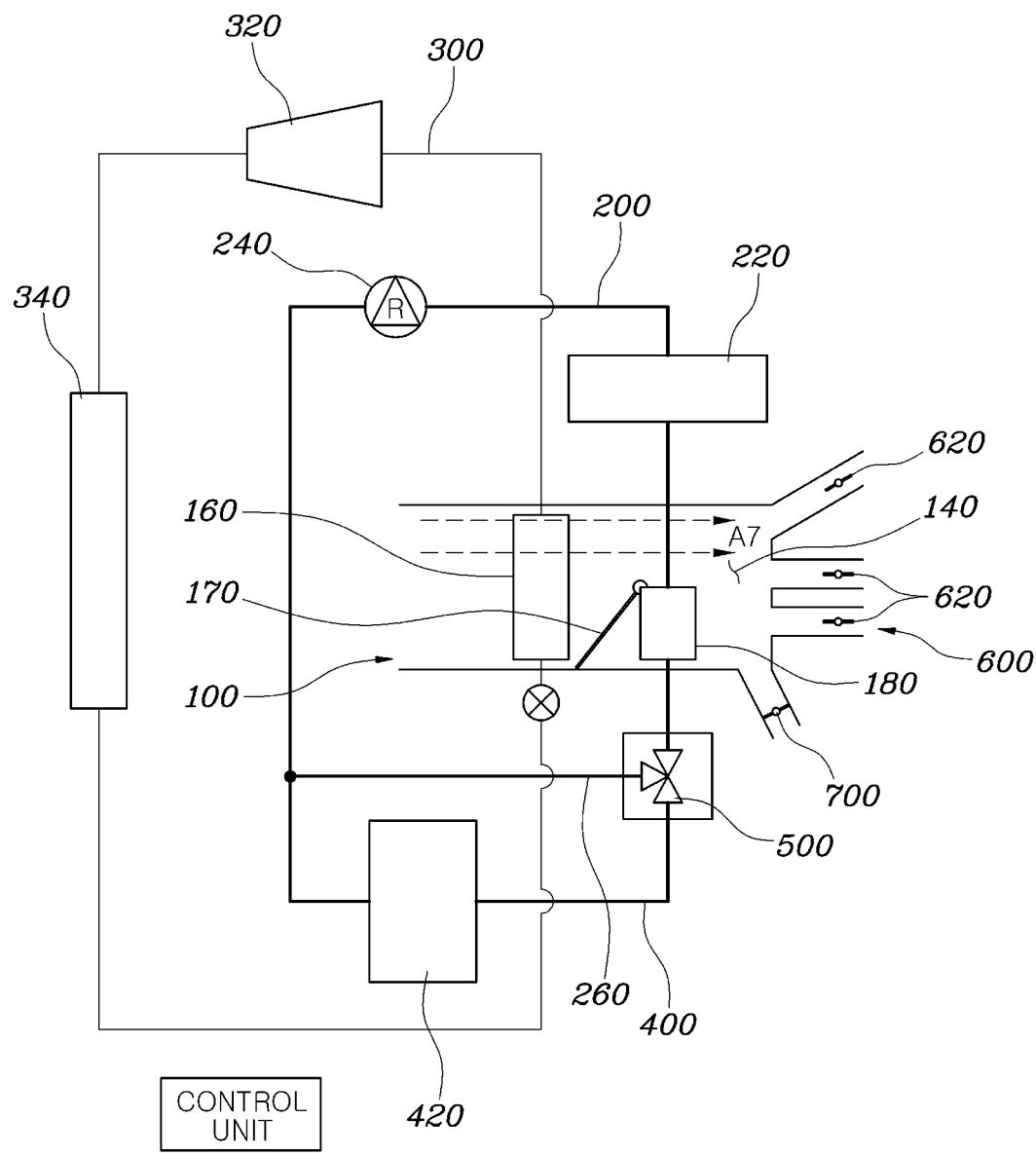
FIG. 8 is a diagram illustrating a seventh mode of a thermal management system for an electric vehicle according to another exemplary embodiment of the present disclosure.
Figure 9:
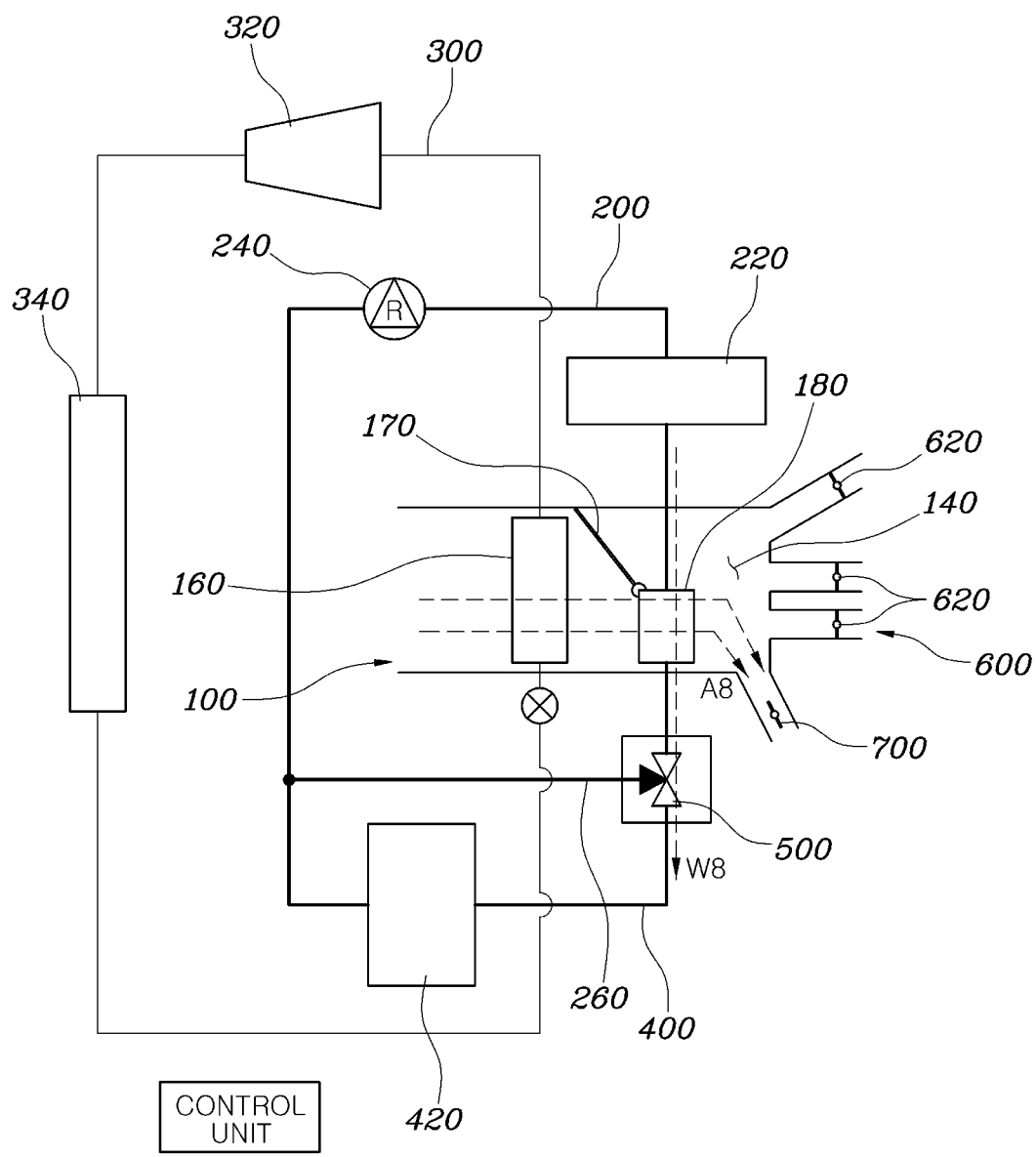
FIG. 9 is a diagram illustrating an eighth mode of a thermal management system for an electric vehicle according to another exemplary embodiment of the present disclosure.

FIG. 1 is a diagram illustrating a thermal management system for an electric vehicle according to an exemplary embodiment of the present disclosure. FIG. 2 is a diagram illustrating a first mode of a thermal management system for an electric vehicle according to an exemplary embodiment of the present disclosure. FIG. 3 is a diagram illustrating a second mode of a thermal management system for an electric vehicle according to another exemplary embodiment of the present disclosure. FIG. 4 is a diagram illustrating a third mode of a thermal management system for an electric vehicle according to another exemplary embodiment of the present disclosure. FIG. 5 is a diagram illustrating a fourth mode of a thermal management system for an electric vehicle according to another exemplary embodiment of the present disclosure. FIG. 6 is a diagram illustrating a fifth mode of a thermal management system for an electric vehicle according to another exemplary embodiment of the present disclosure. FIG. 7 is a diagram illustrating a sixth mode of a thermal management system for an electric vehicle according to another exemplary embodiment of the present disclosure. FIG. 8 is a diagram illustrating a seventh mode of a thermal management system for an electric vehicle according to another exemplary embodiment of the present disclosure. FIG. 9 is a diagram illustrating an eighth mode of a thermal management system for an electric vehicle according to another exemplary embodiment of the present disclosure.

As shown in FIG. 1, the thermal management system for the electric vehicle according to the present disclosure may include an inside air conditioning unit 100 having an air inlet unit 120 and an air outlet unit 140; a cooling core 160 embedded in the inside air conditioning unit 100; a heating core 180 disposed between the air outlet unit 140 of the inside air conditioning unit 100 and the cooling core 160; a control door 170 disposed inside the inside air conditioning unit 100 and configured to adjust air supply to the heating core 180; a first flow path 200 through which a first refrigerant flows, circulating to pass through the heating core 180, and including an electric heater 220; a branch flow path 400 branched from a downstream point of the heating core 180 of the first flow path 200 and passing through a high voltage battery heat exchange unit 420; a control valve 500 disposed in a branch point between the first flow path 200 and the branch flow path 400; and a second flow path 300 through which a second refrigerant flows and circulating between a compressor 320 and a condenser 340 and the cooling core 160.

Particularly, inside air or outside air may be introduced into the air inlet unit 120 of the inside air conditioning unit 100. The air outlet unit 140 may be connected to an indoor space 600 of the vehicle. The thermal management system may decrease or increase the temperature of a high voltage battery mounted within the vehicle, or decrease or increase an indoor temperature of the vehicle (e.g., a temperature within the interior cabin of the vehicle). In the present disclosure, the high voltage battery is in contact with the high voltage battery heat exchange unit 420 shown in FIGS. 1 to 9 to adjust the temperature. In the first flow path 200, the first refrigerant may circulate through a pump 240.

Meanwhile, the inside air conditioning unit 100 of the present disclosure may include the air inlet unit 120 and the air outlet unit 140. As shown in FIGS. 1 to 9, when the inside air or the outside air flows through the air inlet unit 120, temperature of the inside air or the outside air flowing through the cooling core 160 or the heating core 180 is increased or decreased.

The cooling core 160 embedded in the inside air conditioning unit 100 may be connected to the second flow path 300 and cooled through the second refrigerant flowing through the second flow path 300. The second refrigerant may be Freon gas or the like, but is not limited thereto. The second refrigerant may circulate in the second flow path 300 through the compressor 320, the condenser 340, etc. and perform heat exchange with the inside air or the outside air in the cooling core 160 to cool the air, etc. When the cooled inside air or outdoor air is discharged into the indoor space 600 of the vehicle through the air outlet unit 140, the indoor temperature of the vehicle decreases or increases.

As shown in FIGS. 1 to 9, the heating core 180 embedded in the indoor air conditioning unit 100 may be connected to the first flow path 200 and may be heated by the first refrigerant flowing through the first flow path 200. The first refrigerant may be cooling water or the like, but is not limited thereto. The first refrigerant may pass through the electric heater 220 and the high voltage battery heat exchange unit 420, circulate in the first flow path 200, perform heat exchange with the inside air or the outside air in the heating core 180, and heat the air, etc. When the heated inside air or outdoor air is discharged to the inside of the vehicle through the air outlet unit 140, the indoor temperature of the vehicle increases.

Additionally, the first refrigerant cooled after passing through the heating core 180 may pass through the high voltage battery heat exchange unit 420 through the branch flow path 400, thereby decreasing temperature of the high voltage battery heat exchange unit 420. When necessary, the heated first refrigerant may be allowed to flow into the branch flow path 400 to increase the temperature of the high voltage battery heat exchange unit 420. The high voltage battery may be most efficiently and maximally charged and discharged at an appropriate temperature. Accordingly, the temperature of the high voltage battery heat exchange unit 420 may be increased to allow the high voltage battery to have an appropriate temperature even when an outdoor temperature is low, such as in winter or colder temperature conditions, etc.

Meanwhile, the control valve 500 may be disposed at a branch point located at the downstream point of the heating core 180 to guide the first refrigerant to selectively flow through the branch flow path 400 or the first flow path 200. The first refrigerant passing through the heating core 180 may be allowed to flow (e.g., due to the positioning or opening of the control valve) at the same time to a part of the first flow path 200 (hereinafter referred to as a bypass flow path 260) and the branch flow path 400 located at the downstream point of the heating core 180, may be allowed to flow only the bypass flow path 260, or may be allowed to flow only the branch flow path 400.

The thermal management system for the electric vehicle of the related art requires separate thermal management systems to operate the high voltage battery and the indoor temperature of the vehicle, whereas the present disclosure is capable of adjusting the indoor temperature and the high voltage battery of the vehicle using only the existing heating core, which advantageously reduces the overall cost.

Meanwhile, the control door 170 of the present disclosure may be disposed between the cooling core 160 and the heating core 180 to control whether air flowing through the cooling core 160 flows into the heating core 180 or adjust an amount of air flowing thereinto. When the control door 170 closes the heating core 180, the air passing through the cooling core 160 flows into the air outlet unit 140 without passing through the heating core 180. When the control door 170 opens the heating core 180, the air passing through the cooling core 160 flows into the heating core 180 and then flows into the air outlet unit 140 through the heating core 180. Thus, when only cooled air is required, the heating core 180 may be closed by the control door 170 and, when mixed air is required, the heating core 180 may be opened by the control door 170.

Meanwhile, as shown in FIGS. 1 to 9, the branch flow path 400 of the present disclosure may be branched at the downstream point of the heating core 180 of the first flow path 200, pass through the high voltage battery heat exchange unit 420, and join again at an upstream point of the electric heater 220 of the first flow path 200. Accordingly, even if the first refrigerant flows through the branch flow path 400, the first refrigerant may flow through the first flow path 200 again to have one circulation line. The control valve 500 of the present disclosure may be configured to adjust the supply of the first refrigerant to the branch flow path 400. When the control valve 500 closes the branch flow path 400, the first refrigerant may pass through the bypass passage 260. When the control valve 500 opens the branch flow path 400, the first refrigerant may pass through the branch flow path 400 and then join in the first flow path 200.

Meanwhile, as shown in FIG. 1, a flow space 190 may be formed at the side of the heating core 180 in the inside air conditioning unit 100 according to the present disclosure. The air may pass through the cooling core 160 by the operation of the control door 170 (operated by a controller), and then may flow to the air outlet unit 140 through the flow space 190 or may pass through the cooling core 160 and then flow to the air outlet unit 140 through the heating core 180. Additionally, the thermal management system may further include a controller configured to operate the compressor 320, the electric heater 220, the control door 170, and the control valve 500 to adjust the indoor temperature of the vehicle or the temperature of the high voltage battery. The first flow path 200 and the second flow path 300 may be adjusted through the controller.

FIGS. 2 to 9 are diagrams illustrating the first to eighth modes of the present disclosure. "A1, A2, A3, A4, A5, A6, A7, and A8" are reference numerals indicating states where the outside air or the inside air of the vehicle flow. "W1, W2, W3, W4, W5, W6, W7, and W8" are reference numerals indicating states where the first refrigerant circulates the first flow path 200. Specifically, as shown in FIGS. 1 and 2, in the first mode for increasing the indoor temperature of the vehicle or the temperature of the high voltage battery, the controller may be configured to operate the electric heater 220, adjust the control valve 500 to allow the first refrigerant to flow through the branch flow path 400, and adjust the control door 170 to allow air to flow through the heating core 180. In particular, the first refrigerant may be heated by the electric heater 220, and the inside air or the outside air of the vehicle may be heated by the heating core 180 and discharged to the indoor space 600 of the vehicle. The high voltage battery heat exchange unit 420 may be heated by the first refrigerant. The compressor 320 may be operated such that the cooling core 160 does not operate, and thus the inside air or the outside air of the vehicle may not be cooled.

As shown in FIGS. 1 and 3, in the second mode for increasing the indoor temperature of the vehicle and cooling the high voltage battery, the controller may be configured to adjust the control valve 500 to allow the first refrigerant to flow through the branch flow path 400, and adjust the control door 170 to allow air to flow through the heating core 180. In particular, the first refrigerant may be heated through the high voltage battery heat exchange unit 420, and the inside air or the outside air of the vehicle may be heated by the heating core 180 and discharged to the interior of the vehicle. The first refrigerant cooled in the heating core 180 may then cool the high voltage battery heat exchange unit 420 again. The compressor 320 may be operated such that the cooling core 160 does not operate, and thus the electric heater 220 may also be controlled not to operate.

As shown in FIGS. 1 and 4, in the third mode for cooling the interior of the vehicle and increasing the temperature of the high voltage battery, the controller may be configured to operate the compressor 320 and the electric heater 220, adjust the control valve 500 to allow the first refrigerant to flow through the first flow path 200 and the branch flow path 400 at the branch point, and adjust the control door 170 to allow air to flow through the flow space 190. In particular, the first refrigerant may be heated by the electric heater 220 to increase the temperature of the high voltage battery heat exchange unit 420. The air cooled through the cooling core 160 does not pass through the heating core 180 but may pass through the flow space 190 and be discharged to the interior of the vehicle through the air outlet unit 140.

As shown in FIGS. 1 and 5, in the fourth mode for cooling the interior of the vehicle and the high voltage battery and dehumidifying the outside air or the inside air of the vehicle, the controller may be configured to operate the compressor 320, adjust the control valve 500 to allow the first refrigerant to flow through the first flow path 200 and the branch flow path 400 at the branch point, and adjust the control door 170 to allow air to flow through the electric heater 220. In particular, the first refrigerant may be heated after cooling the high voltage battery heat exchange unit 420, and then may flow to the heating core 180 again. Additionally, humidity of the air cooled through the cooling core 160 may decrease since the cooling core 160 is humidified. The temperature may increase again in the heating core 180, and the relative humidity may increase. Therefore, the cooled and dehumidified air may be discharged into the interior of the vehicle. Since the first refrigerant heated only by the high voltage battery heat exchange unit 420 does not have a high temperature, even when the cooled air passes through the heating core 180, the temperature may only increase minimally, and thus the cooled air may be discharged.

As shown in FIGS. 1 and 6, in the fifth mode for maintaining the temperature of the high voltage battery and increasing the indoor temperature of the vehicle, the controller may be configured to operate the electric heater 220, adjust the control valve 500 to allow the first refrigerant to flow through the first flow path 200, and adjust the control door 170 to allow air to flow through the heating core 180. In particular, since the first refrigerant heated by the electric heater 220 may be heat-exchanged in the heating core 180 to heat the air, and flows only the bypass flow path 260 through the control valve 500, the first refrigerant may be prevented or blocked from flowing through the high voltage battery heat exchange unit 420, and thus the temperature of the high voltage battery heat exchange unit 420 may be maintained and only the indoor temperature of the vehicle may be increased.

As shown in FIGS. 1 and 7, in the sixth mode for maintaining the indoor temperature of the vehicle and increasing the temperature of the high voltage battery, the controller may be configured to operate the electric heater 220, and adjust the control valve 500 to allow the first refrigerant to flow through the branch flow path 400 at the branch point. In particular, the first refrigerant heated by the electric heater 220 may perform heat exchange with the high voltage battery heat exchange unit 420, and the temperature of the high voltage battery may be increased.

Additionally, as shown in FIGS. 1 and 8, in the seventh mode for maintaining the temperature of the high voltage battery and cooling the interior of the vehicle, the controller may be configured to operate the compressor 320 to control air to flow through the flow space 190. In particular, the cooled air passing through the cooling core 160 may be discharged to the interior through the flow space 190, and thus the indoor temperature of the vehicle may be decreased. As shown in FIGS. 1 to 9, an outlet for discharging air to the outside of the vehicle may be provided in the air outlet unit 140 of the inside air conditioning unit 100 and an opening and closing door 700 configured to adjust the opening and closing of the outlet. The air may be discharged to the outside of the vehicle by adjustment of the opening and closing door 700.

As shown in FIGS. 1 and 9, in the eighth mode for maintaining the indoor temperature of the vehicle and cooling the high voltage battery, the controller may be configured to operate the compressor 320, adjust the control valve 500 to allow the first refrigerant to flow through the branch flow path 400, adjust the control door 170 to allow air to flow through the heating core 180, and adjust the outlet to allow the air to be discharged to the outside of the vehicle. In particular, the cooled air passing through the cooling core 160 may be heat exchanged with the heating core 180. Thus, the first refrigerant passing through the heating core 180 may be cooled, and the cooled first refrigerant may cool the high voltage battery heat exchange unit 420. Further, since the opening and closing door 700 is opened, air passing through the heating core 180 may be discharged to the outside of the vehicle through the outlet ("A8" in FIG. 9). In addition, an indoor space door 620 configured to adjust flow of air into the indoor space 600 of the vehicle may be closed to prevent air from flowing into the indoor space 600 of the vehicle.

According to the thermal management system for the electric vehicle, the thermal management system may increase or decrease a temperature of the interior of a vehicle or a high voltage battery. In particular, there are advantages in that a single system may simultaneously adjust a temperature of the interior of a vehicle or a high voltage battery, and thus the number of required parts may be reduced and the cost may be reduced compared with using separate systems to adjust the temperature of the interior of the vehicle or the high voltage battery.

The effects obtained by the present disclosure are not limited to the effects mentioned above, and other effects that are not mentioned may be clearly understood by those skilled in the art from the following description. Although the present disclosure has been shown and described with respect to specific exemplary embodiments, it will be apparent to those having ordinary skill in the art that the present disclosure may be variously modified and altered without departing from the spirit and scope of the present disclosure as defined by the following claims

What is claimed is:

1. A thermal management system for an electric vehicle, comprising:
    an inside air conditioning unit disposed with an air inlet unit and an air outlet unit;
    a cooling core embedded within the inside air conditioning unit;
    a heating core disposed between the air outlet unit of the inside air conditioning unit and the cooling core;
    a control door disposed inside the inside air conditioning unit and configured to adjust air supply to the heating core;
    a first flow path through which a first refrigerant flows, circulating to pass through the heating core, and having an electric heater;
    a branch flow path branched from a downstream point of the heating core of the first flow path and passing through a high voltage battery heat exchange unit;
    a control valve disposed in a branch point between the first flow path and the branch flow path; and
    a second flow path through which a second refrigerant flows and circulating between a compressor and a condenser and the cooling core.

2. The thermal management system for the electric vehicle of claim 1, wherein inside air or outdoor air is introduced into the air inlet unit of the inside air conditioning unit, and the air outlet unit is connected to an indoor space of the vehicle.

3. The thermal management system for the electric vehicle of claim 1, wherein the control door is disposed between the cooling core and the heating core to control whether air flowing through the cooling core flows into the heating core.

4. The thermal management system for the electric vehicle of claim 1, wherein the branch flow path is branched at the downstream point of the heating core of the first flow path, passes through the high voltage battery heat exchange unit, and joins again at an upstream point of the electric heater of the first flow path.

5. The thermal management system for the electric vehicle of claim 1, wherein the control valve adjusts a supply of the first refrigerant to the branch flow path.

6. The thermal management system for the electric vehicle of claim 1, wherein a flow space is formed on a side of the heating core inside the inside air conditioning unit, and air flows through the cooling core based on adjustment of the control door, and then flows into the air outlet unit through the flow space or passes through the cooling core and then flows into the air outlet unit through the heating core.

7. The thermal management system for the electric vehicle of claim 1, further comprising:
    a controller configured to operate the compressor, the electric heater, the control door, and the control valve to adjust a temperature of an interior of the vehicle or a high voltage battery.

8. The thermal management system for the electric vehicle of claim 7, wherein, in a first mode for increasing the indoor temperature of the vehicle or the temperature of the high voltage battery, the controller is configured to operate the electric heater, adjust the control valve to allow the first refrigerant to flow through the branch flow path, and adjust the control door to allow air to flow through the heating core.

9. The thermal management system for the electric vehicle of claim 7, wherein, in a second mode for increasing the indoor temperature of the vehicle and cooling the high voltage battery, the controller is configured to adjust the control valve to allow the first refrigerant to flow through the branch flow path, and adjust the control door to allow air to flow through the heating core.

10. The thermal management system for the electric vehicle of claim 7, wherein, in a third mode for cooling the interior of the vehicle and increasing the temperature of the high voltage battery, the controller is configured to operate the compressor and the electric heater, adjust the control valve to allow the first refrigerant to flow through the first flow path and the branch flow path at the branch point, and adjust the control door to allow air to flow through the flow space.

11. The thermal management system for the electric vehicle of claim 7, wherein, in a fourth mode for cooling the interior of the vehicle and the high voltage battery and dehumidifying outside air or inside air of the vehicle, the controller is configured to operate the compressor, adjust the control valve to allow the first refrigerant to flow through the first flow path and the branch flow path at the branch point, and adjust the control door to allow air to flow through the electric heater.

12. The thermal management system for the electric vehicle of claim 7, wherein, in a fifth mode for maintaining the temperature of the high voltage battery and increasing the indoor temperature of the vehicle, the controller is configured to operate the electric heater, adjust the control valve to allow the first refrigerant to flow through the first flow path, and adjust the control door to allow air to flow through the heating core.

13. The thermal management system for the electric vehicle of claim 7, wherein, in a sixth mode for maintaining the indoor temperature of the vehicle and increasing the temperature of the high voltage battery, the controller is configured to operate the electric heater, and adjust the control valve to allow the first refrigerant to flow through the branch flow path at the branch point.

14. The thermal management system for the electric vehicle of claim 7, wherein, in a seventh mode for maintaining the temperature of the high voltage battery and cooling the interior of the vehicle, the controller is configured to operate the compressor to control air to flow through the flow space.

15. The thermal management system for the electric vehicle of claim 7, wherein an outlet for discharging air to an outside of the vehicle is formed in the air outlet unit of the inside air conditioning unit and an opening and closing door configured to adjust opening and closing of the outlet is provided.

16. The thermal management system for the electric vehicle of claim 15, wherein, in an eighth mode for maintaining the indoor temperature of the vehicle and cooling the high voltage battery, the controller is configured to operate the compressor, adjust the control valve to allow the first refrigerant to flow through the branch flow path, adjust the control door to allow air to flow through the heating core, and adjust the outlet to allow the air to be discharged to the outside of the vehicle.

\* \* \* \* \*